United States Patent
Wang et al.

(10) Patent No.: US 10,243,236 B2
(45) Date of Patent: Mar. 26, 2019

(54) OVERCHARGING PREVENTIVE ELECTROLYTE AND LITHIUM-ION BATTERY

(71) Applicant: NingDe Contemporary Amperex Technology Limited, NingDe, FuJian Province (CN)

(72) Inventors: Kefei Wang, NingDe (CN); Yongshou Lin, NingDe (CN); Jie Chen, NingDe (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 239 days.

(21) Appl. No.: 15/173,297

(22) Filed: Jun. 3, 2016

(65) Prior Publication Data
US 2017/0018803 A1 Jan. 19, 2017

(30) Foreign Application Priority Data
Jul. 13, 2015 (CN) .......................... 2015 1 0407716

(51) Int. Cl.
*H01M 10/05* (2010.01)
*H01M 10/0567* (2010.01)
(Continued)

(52) U.S. Cl.
CPC ... *H01M 10/0567* (2013.01); *H01M 10/0525* (2013.01); *H01M 10/0568* (2013.01); *H01M 10/0569* (2013.01)

(58) Field of Classification Search
None
See application file for complete search history.

(56) References Cited

FOREIGN PATENT DOCUMENTS

| KR | 20150130910 A | * | 11/2015 |
| KR | 20150130910 A | * | 11/2015 |

OTHER PUBLICATIONS

KR 20150130910 A Machine English Translation (appears side-by-side with original Korean document).*

* cited by examiner

*Primary Examiner* — Scott J. Chmielecki
(74) *Attorney, Agent, or Firm* — Arent Fox LLP

(57) ABSTRACT

The present disclosure provides an overcharging preventive electrolyte and a lithium-ion battery. The overcharging preventive electrolyte can improve the safety performance of a lithium-ion battery without affecting the cycle performance thereof. The overcharging preventive electrolyte comprises a lithium salt, a non-aqueous organic solvent, and a combined additive including an additive A and an additive B. The additive A is at least one selected from Formula 1, Formula 2, and Formula 3; the additive B is at least one selected from Formula 4, Formula 5, and Formula 6.

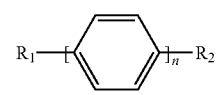

Formula 1

Formula 2

Formula 3

(Continued)

-continued
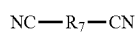
Formula 4
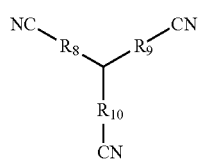
Formula 5
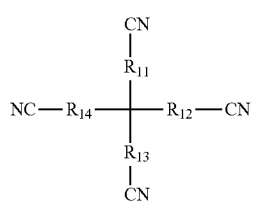
Formula 6
20 Claims, 1 Drawing Sheet
(51) Int. Cl.
*H01M 10/0525* (2010.01)
*H01M 10/0568* (2010.01)
*H01M 10/0569* (2010.01)

Table 1

| | Additive A and Content (%) | | Additive B and Content (%) | | Over-charging endurance | | | Capacity retention rate after n times of cycles at 45 C (%) | | | |
|---|---|---|---|---|---|---|---|---|---|---|---|
| | BPL | PBL | BPN | PTN | Peak temp (°C) | Time to reach the peak temp. (min) | Battery state after testing | 50 times | 100 times | 200 times | 300 time |
| Example 1 | 2 | 0 | 0.01 | 0 | 105 | 25 | 3/5 pass 2/5 leak | 97.6 | 94.4 | 90.5 | 88.3 |
| Example 2 | 2 | 0 | 0.1 | 0 | 106 | 26 | 3/5 pass 2/5 leak | 97.6 | 93.5 | 90.3 | 88.2 |
| Example 3 | 2 | 0 | 2 | 0 | 107 | 30 | 4/5 pass 1/5 leak | 97.7 | 94.5 | 90.5 | 88.4 |
| Example 4 | 2 | 0 | 5 | 0 | 102 | 27 | 5/5 pass | 97.1 | 93.6 | 86.3 | 84.7 |
| Example 5 | 2 | 0 | 10 | 0 | 103 | 23 | 5/5 pass | 96.3 | 91.2 | 84.7 | 81.4 |
| Example 6 | 0.01 | 0 | 2 | 0 | 104 | 29 | 5/5 pass | 91.1 | 86.5 | 80.3 | 77.2 |
| Example 7 | 0.1 | 0 | 2 | 0 | 102 | 25 | 5/5 pass | 92.3 | 87.3 | 82.5 | 79.5 |
| Example 8 | 1 | 0 | 2 | 0 | 109 | 32 | 5/5 pass | 95.7 | 90.8 | 84.4 | 80.8 |
| Example 9 | 3 | 0 | 2 | 0 | 105 | 30 | 5/5 pass | 88.0 | 83.5 | 77.6 | 74.3 |
| Example 10 | 5 | 0 | 2 | 0 | 103 | 28 | 5/5 pass | 87.6 | 87.9 | 75.9 | 73.9 |
| Example 11 | 2 | 0 | 0 | 2 | 105 | 23 | 5/5 pass | 93.7 | 90.0 | 86.4 | 84.9 |
| Example 12 | 0 | 2 | 0 | 2 | 106 | 25 | 5/5 pass | 94.1 | 90.3 | 86.7 | 84.3 |
| Example 13 | 0 | 1 | 0 | 2 | 103 | 24 | 5/5 pass | 95.6 | 92.8 | 89.1 | 86.6 |
| Example 14 | 0 | 2 | 0 | 1 | 105 | 24 | 5/5 pass | 94.7 | 90.9 | 87.3 | 85.8 |
| Example 15 | 0 | 3 | 0 | 1 | 106 | 24 | 5/5 pass | 94.4 | 90.3 | 87.2 | 85.1 |
| Example 16 | 1 | 3 | 0 | 1 | 101 | 28 | 5/5 pass | 94.6 | 90.7 | 87.5 | 85.4 |
| Example 17 | 0 | 3 | 1 | 1 | 102 | 29 | 5/5 pass | 94.8 | 90.6 | 87.6 | 85.5 |
| Comparison Example 1 | 0 | 0 | 0 | 0 | 256 | 46 | 5/5 on fire | 97.8 | 94.6 | 90.7 | 89.2 |
| Comparison Example 2 | 0 | 0 | 2 | 0 | 255 | 51 | 2/5 on fire 3/5 leak | 92.5 | 90.8 | 85.2 | 82.3 |
| Comparison Example 3 | 2 | 0 | 0 | 0 | 269 | 56 | 3/5 on fire 2/5 leak | 95.2 | 91.3 | 84.6 | 80.4 |

OVERCHARGING PREVENTIVE ELECTROLYTE AND LITHIUM-ION BATTERY

CROSS-REFERENCE TO RELATED APPLICATION(S)

This application claims the benefit of Chinese Patent Application No. 201510407716.8, entitled "OVERCHARGING PREVENTIVE ELECTROLYTE AND LITHIUM-ION BATTERY" and filed on Jul. 13, 2015 in the State Intellectual Property Office of the People's Republic of China (PRC) (SIPO), the disclosure of which is expressly incorporated by reference herein in its entirety.

BACKGROUND

Field

The present disclosure relates to the field of lithium-ion batteries, and more specifically, to an overcharging preventive electrolyte and lithium-ion battery.

Background

As most of current lithium-ion batteries use carbonate ester organic electrolytes that are extremely flammable, overcharging, over-discharging, and overheat of the batteries could all likely cause the batteries to burn or even explode. Given that fundamental changes to electrode materials, electrolyte materials, and separator materials are unlikely to happen for the foreseeable future, improving the stability of electrolyte is an important way to improve the safety of lithium-ion batteries.

Overcharging preventive electrolytes of lithium-ion batteries are categorized mainly into two types: the electro-polymerization type and the REDOX type. Although the electro-polymerization type additives, such as biphenyl and cyclohexylbenzene, can effectively inhibit battery overcharging, the addition thereof will damage the cycle performance of a battery. On the other hand, even though the REDOX type additives, such as ferrocene and derivatives thereof, anisyl benzene and derivatives thereof, etc., have reversible overcharging protection mechanisms, due to the relatively low oxidation potential thereof, redox reaction takes place before the normal operating voltage (e.g., 4.2 V) of a lithium-ion battery is reached. This often restricts the large-scale applications of the REDOX type additives in lithium-ion batteries of different battery material systems. WO Publication No. WO2008138132A1 published on Nov. 20, 2008 discloses application examples in which nitrile compounds are used as solvents or additives for electrolytes of lithium-ion batteries, and describes the prospect of nitrile compounds being used as solvents for electrolytes. Nitrile compounds, such as glutaronitrile and adiponitrile, have an electrochemical window up to 8.3 V (vs Li/Li$^+$), which is wider than the electrochemical windows of all aprotic solvents, including sulfones, and have the advantages of good thermal stability, low viscosity, and high dielectric constant. However, the compatibility between nitrile compounds and low-potential cathodic active materials for lithium-ion batteries, such as graphite or metal lithium, is relatively poor. It is very easy for polymerization reaction to take place on the surface of cathode. The polymerization products will block the de-intercalation of Li$^+$, which affects the cycle performance of lithium-ion batteries.

SUMMARY

In view of the problems in the prior art, the object of the present disclosure is to provide an overcharging preventive electrolyte and lithium-ion battery. The overcharging preventive electrolyte can effectively improve the safety of a lithium-ion battery without affecting the cycle performance of the lithium-ion battery.

To attain the above objective, according to a first aspect of the present disclosure, the present disclosure provides an overcharging preventive electrolyte, which comprises a lithium salt, a non-aqueous organic solvent, and a combined additive. The combined additive comprises an additive A and an additive B. The additive A is at least one selected from Formula 1, Formula 2, and Formula 3; wherein, each of $R_1$ to $R_6$ is one independently selected from the group consisting of fluorine, chlorine, bromine, nitro groups, cyano groups, alkyl groups, alkoxyl groups, halogenated alkyl groups, isocyanate groups, trifluoromethylsulfonyl groups, trifluoroacetyl groups, carboxyl groups, lithium carboxylates, sodium carboxylates, phosphate groups, lithium phosphates, sodium phosphates, sulfonic groups, lithium sulfonates or sodium sulfonates, n being a natural number in the range of 1 to 5;

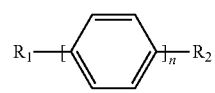

Formula 1

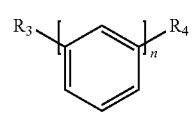

Formula 2

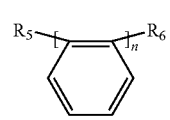

Formula 3 the additive B is at least one selected from Formula 4, Formula 5, and Formula 6; wherein, each of $R_7$ to $R_{14}$ is one independently selected from the group consisting of linear alkyl groups with 1 to 10 carbon atoms, side chain-containing alkyl groups, double bond-containing hydrocarbon groups, triple bond-containing hydrocarbon groups, ether bond-containing alkyl groups, or carbonyl-containing alkyl groups;

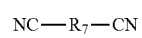

Formula 4

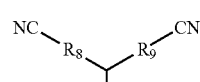

Formula 5

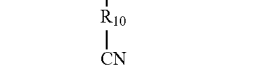

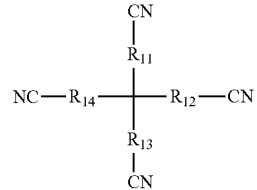

Formula 6 any one of $R_8$, $R_9$, and $R_{10}$ may be absent such that CN is directly connected to the tertiary carbon in the center; any one of $R_{11}$, $R_{12}$, $R_{13}$, and $R_{14}$ may be absent such that CN is directly connected to the quaternary carbon in the center.

According to a second aspect of the present disclosure, the present disclosure provides a lithium-ion battery, which comprises a positive film, a negative film, an electrolyte, and a separator disposed between the positive film and the negative film, wherein the electrolyte is the overcharging preventive electrolyte according to the first aspect of the present disclosure.

The present disclosure has the following advantageous effects: the combined use of the additive A and the additive B in the electrolyte according to the present disclosure can result in an excellent synergic action, which can prevent a lithium-ion battery from being overcharged, and moreover, does not affect the cycle performance of the lithium-ion battery.

BRIEF DESCRIPTION OF THE DRAWINGS

FIG. 1 is a diagram illustrating Table 1 that provides parameters and performance testing results of examples 1 to 17 and comparison examples 1 to 3.

DETAILED DESCRIPTION

The present disclosure and the advantageous effects of certain configurations will be further described in detail below with reference to the accompanying drawings and specific embodiments.

The overcharging preventive electrolyte and the lithium-ion battery according to the present disclosure, as well as examples, comparison examples, the testing process, and testing results thereof, will be described in detail below.

First, the overcharging preventive electrolyte according to a first aspect of the present disclosure will be described.

The overcharging preventive electrolyte according to the first aspect of the present disclosure comprises a lithium salt, a non-aqueous organic solvent, and a combined additive. The combined additive comprises an additive A and an additive B. The additive A is at least one selected from Formula 1, Formula 2, and Formula 3; wherein, each of $R_1$ to $R_6$ is one independently selected from the group consisting of fluorine, chlorine, bromine, nitro groups, cyano groups, alkyl groups, alkoxyl groups, halogenated alkyl groups, isocyanate groups, trifluoromethylsulfonyl groups, trifluoroacetyl groups, carboxyl groups, lithium carboxylates, sodium carboxylates, phosphate groups, lithium phosphates, sodium phosphates, sulfonic groups, lithium sulfonates or sodium sulfonates, n being a natural number in the range of 1 to 5;

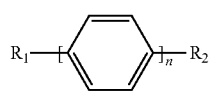

Formula 1

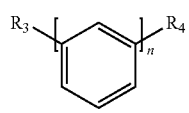

Formula 2

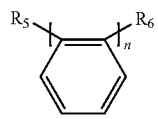

Formula 3 the additive B is at least one selected from Formula 4, Formula 5, and Formula 6; wherein, each of $R_7$ to $R_{14}$ is one independently selected from the group consisting of linear alkyl groups with 1 to 10 carbon atoms, side chain-containing alkyl groups, double bond-containing hydrocarbon groups, triple bond-containing hydrocarbon groups, ether bond-containing alkyl groups, or carbonyl-containing alkyl groups;

Formula 4

Formula 5

Formula 6 any one of $R_8$, $R_9$, and $R_{10}$ may be absent such that CN is directly connected to the tertiary carbon in the center; any one of $R_{11}$, $R_{12}$, $R_{13}$, and $R_{14}$ may be absent such that CN is directly connected to the quaternary carbon in the center.

In the overcharging preventive electrolyte according to the first aspect of the present disclosure, the additive B has a special molecular structure, with the middle of the molecule being a linear alkyl group, a side chain-containing alkyl group, a double bond-containing hydrocarbon group, a triple bond-containing hydrocarbon group, an ether bond-containing alkyl group, or a carbonyl-containing alkyl group of a flexible chain shape, and the outer ends having a plurality of cyano groups with strong electron withdrawing power. First, the additive B is an aprotic solvent, which can avoid the introduction of $H^+$; second, the additive B has a stronger chelating power, which can form a protective film on the surface of the positive electrode through chelation and does not require a specific reaction potential; third, the electron cloud of the additive B has a more even distribution, which can control the thickness of the protective film on the surface of the electrode by the electrochemical polymerization product of the additive A; last, the oxidizing potential of the additive B is slightly higher than the electrochemical polymerization potential of the additive A. In such a way, during the operation of a lithium-ion battery, the additive B can first form a protective film on the surface of the positive electrode through chelation, subsequently when the film-forming potential of the additive A is reached, the additive A will also form a protective film on the surface of the positive electrode through electrochemical polymerization. Due to the hydrogen bonding action between molecules of the additive B and the additive A, the two may be bonded together through interactions between molecules. Moreover, the additive B can prevent the additive A from forming an overly thick film on the surface of the electrode, thereby avoiding the issue of lithium precipitation. Furthermore, due to the relatively strong chelation between the additive B and the surface of the positive electrode, the additive A will first form an uniform and complementary film on the region of the additive B where no film is formed. As a result, on one hand, the additive B can slow down the film forming on regions already with a film formed; and on the other hand, the additive B can advance film forming on the region where no film is formed.

The additive B has the characteristics of wide electrochemical window, good thermal stability, low viscosity, and high dielectric constant. Due to the relatively strong chelation between the additive B and the surface of the positive electrode, and due to the hydrogen bonding action between molecules of the additive A and the additive B, the consequently formed protective film is more stable, and a uniform film can be formed while improving the stability of the protective film, the possibility that the electrolyte is oxidized is lowered, and the overcharging endurance performance of a lithium-ion battery is improved. It is easy to form hydrogen bonds between the additive A and the additive B. The combined use of the additive A and the additive B also overcomes the issue of poor compatibility between the additive B and low-potential cathodic active materials for lithium-ion batteries, such as graphite or metal lithium, which improves the cycle performance of lithium-ion batteries. Therefore, the combined use of the additive A and the additive B can result in an excellent synergic action, which can prevent a lithium-ion battery from being overcharged, and moreover, does not affect the cycle performance of the lithium-ion battery.

In the overcharging preventive electrolyte according to the first aspect of the present disclosure, in one configuration, each of $R_1$ to $R_6$ is one independently selected from the group consisting of fluorine, chlorine, bromine, nitro groups, cyano groups, isocyanate groups, trifluoromethylsulfonyl groups, trifluoroacetyl groups, carboxyl groups, lithium carboxylates, sodium carboxylates, phosphate groups, lithium phosphates, sodium phosphates, sulfonic groups, lithium sulfonates or sodium sulfonates. This is because the additive A is a group of benzene or biphenyl derivatives, as benzene or biphenyl will undergo a trace amount of irreversible electrochemical polymerization reaction during normal cycles as catalyzed by active substances in the electric core material and electric potential, and H$^+$ may appear during the electrochemical polymerization process, which ultimately leads to the production of hydrogen gas and then causes the swelling of the lithium-ion battery that affects the cycle performance of the lithium-ion battery. To inhibit the occurrence of electrochemical polymerization reaction during normal cycles, in one configuration, $R_1$ to $R_6$ are electron withdrawing groups, on one hand, the introduction of these electron withdrawing groups will prevent electrochemical polymerization reaction from taking place during normal cycles, and on the other hand, electrons on the ring are delocalized due to the electron withdrawing effect of the electron withdrawing groups, which increases the oxidizing potential of the additive A such that the chances for the additive A to undergo electrochemical polymerization reaction are reduced. The oxidizing and polymerizing potential of the additive A is between 4.5 V and 4.8 V, which is slightly higher than the potential of the positive electrode of the lithium-ion battery during charging and discharging, and at the same time, lower than the potential when the active material of the positive electrode undergoes a violent exothermic reaction with the electrolyte, making the additive A a very proper overcharging preventive additive. When each of $R_1$ to $R_6$ is independently selected from the group consisting of alkyl groups, alkoxyl groups, and halogenated alkyl groups, $R_1$ to $R_6$ are electron donating groups. Although they can also increase the oxidizing potential of the additive A and improve the overcharging preventive electrolyte performance of a battery, the effect is not as good as when $R_1$ to $R_6$ are selected from the electron withdrawing groups described above.

Specifically, in the overcharging preventive electrolyte according to the first aspect of the present disclosure, the additive A may be at least one selected from the group consisting of 4,4'-biphenyldisulfonic acid, lithium 4,4'-biphenyldisulfonate, sodium 4,4'-biphenyldisulfonate, 2,2'-biphenyldisulfonic acid, lithium 2,2'-biphenyldisulfonate, sodium 2,2'-biphenyldisulfonate, 3,3'-biphenyldisulfonic acid, lithium 3,3'-biphenyldisulfonate, sodium 3,3'-biphenyldisulfonate, 4'-ethyl-4-cyanobiphenyl, 3-trifluoromethylphenyl isocyanate, 4-methylphenyl isocyanate, 3-chloroanisole, 3-fluoroanisole, sodium phthalate, lithium phthalate, p-fluorotoluene, o-fluorotoluene, and m-fluorotoluene.

In one configuration, in the overcharging preventive electrolyte according to the first aspect of the present disclosure, each of $R_1$ to $R_6$ may be one independently selected from the group consisting of lithium carboxylates, sodium carboxylates, lithium phosphates, sodium phosphates, lithium sulfonates or sodium sulfonates. The lithium salt or sodium salt structure also can improve the transport capability of lithium-ions in the pole pieces. Namely, either $R_1$ or $R_2$ may be one selected from the group consisting of lithium carboxylates, sodium carboxylates, lithium phosphates, sodium phosphates, lithium sulfonates or sodium sulfonates; either $R_3$ or $R_4$ may be one selected from the group consisting of lithium carboxylates, sodium carboxylates, lithium phosphates, sodium phosphates, lithium sulfonates or sodium sulfonates; either $R_5$ or $R_6$ may be one selected from the group consisting of lithium carboxylates, sodium carboxylates, lithium phosphates, sodium phosphates, lithium sulfonates or sodium sulfonates. Specifically, the additive A may be at least one selected from the group consisting of 4,4'-biphenyldisulfonic acid, lithium 4,4'-biphenyldisulfonate, sodium 4,4'-biphenyldisulfonate, 2,2'-biphenyldisulfonic acid, lithium 2,2'-biphenyldisulfonate, sodium 2,2'-biphenyldisulfonate, 3,3'-biphenyldisulfonic acid, lithium 3,3'-biphenyldisulfonate, sodium 3,3'-biphenyldisulfonate, sodium phthalate, and lithium phthalate.

In the overcharging preventive electrolyte according to the first aspect of the present disclosure, the additive B may be at least one selected from the group consisting of propanedinitrile, butanedinitrile, glutaronitrile, adiponitrile, heptanedinitrile, cyanomethoxy acetonitrile, 1,3,6-hexanetrinitrile, 1,2,3-propanetrinitrile, 1,3,5-pentanetrinitrile, 3,3-bis(cyanomethyl) glutaronitrile, and 3,3-bis(cyanomethyl) adiponitrile.

In the overcharging preventive electrolyte according to the first aspect of the present disclosure, Formula 4, Formula 5, and Formula 6 have an asymmetric structure. The substituting group (i.e. the cyano group) in the asymmetric structure has a different electron withdrawing capability, the molecules have increased polarity and become easier to diffuse, and as a result, the reactivity is increased and the overcharging endurance performance of the lithium-ion battery is improved. Specifically, the additive B may be at least one selected from the group consisting of cyanomethoxy acetonitrile, 1,3,6-hexanetrinitrile, and 3,3-bis(cyanomethyl) adiponitrile.

In the overcharging preventive electrolyte according to the first aspect of the present disclosure, the weight of the additive A may be 0.01% to 5%, and in one configuration 0.1% to 3%, of the total weight of said overcharging preventive electrolyte. The weight of the additive B may be 0.01% to 10%, and in one configuration 0.1% to 5%, of the total weight of said overcharging preventive electrolyte.

In the overcharging preventive electrolyte according to the first aspect of the present disclosure, the lithium salt may be at least one selected from the group consisting of lithium hexafluorophosphate, lithium tetrafluoroborate, lithium hexafluoroarsenate, lithium perchlorate, lithium trifluorosulfonate, lithium bis(trifluoromethanesulfonyl)imide, lithium bis(fluoromethanesulfonyl)imide, and tris(trifluoromethanesulfonyl)methyl lithium.

In the overcharging preventive electrolyte according to the first aspect of the present disclosure, the concentration of the lithium salt may be 0.5 M to 3 M.

In the overcharging preventive electrolyte according to the first aspect of the present disclosure, the organic solvent may be at least one selected from the group consisting of ethylene carbonate, propylene carbonate, dimethyl carbonate, diethyl carbonate, methylethyl carbonate, γ-butyrolactone, methyl formate, ethyl formate, propyl formate, ethyl propionate, propyl propionate, butyl formate, butyl acetate, butyl propionate, butyl butyrate, and tetrahydrofuran.

Next, the lithium-ion battery according to a second aspect of the present disclosure will be described.

The lithium-ion battery according to the second aspect of the present disclosure comprises a positive film, a negative film, an electrolyte, and a separator disposed between the positive film and the negative film. The electrolyte is the overcharging preventive electrolyte according to the first aspect of the present disclosure.

In the lithium-ion battery according to the second aspect of the present disclosure, the positive film may comprise a positive electrode current collector and a positive electrode membrane disposed on the positive electrode current collector. The positive electrode membrane comprises a positive electrode active material, a bonding agent, and a conductive agent. The positive electrode active material may be at least one selected from the group consisting of $LiCoO_2$, $LiFePO_4$, $LiMn_2O_4$, and $Li(Co_xNi_yMn_{1-x-y})O_2$, wherein, $0.1 \le x \le 0.8$, $0.1 \le y \le 0.8$, and $0.3 \le x+y \le 0.9$.

In the lithium-ion battery according to the second aspect of the present disclosure, the negative film may comprise a negative electrode active material, a bonding agent, and a conductive agent. The negative electrode active material may be at least one selected from the group consisting of graphite, silicon, and tin.

Next, examples and comparison examples of the non-aqueous electrolyte and the lithium-ion battery according to the present disclosure will be described, wherein the bonding agent in the positive electrode membrane is polyvinylidene difluoride (PVDF) purchased from Shenzhen Advanced Material Co., Ltd.; the thickening agent in the negative electrode membrane is sodium carboxymethyl cellulose (CMC) purchased from Zhengzhou Zhi Yi Chemical Products Co., Ltd.; the bonding agent in the negative electrode membrane is styrene-butadiene rubber (SBR) purchased from LG Chem Ltd.; the conductive agent in both the positive electrode membrane and the negative electrode membrane is conductive carbon black Super-P purchased from Swiss Timcal.

Step One: Preparation of the Electrolyte

In a glove box with the argon protection, stir and mix the non-aqueous organic solvent homogeneously according to a certain ratio, then slowly add the lithium salt, when the lithium salt is dissolved, add the additives, stir homogeneously to no precipitation, no suspension or no stratification, subsequently continue to stir for 1 hr and obtain the electrolyte.

The non-aqueous organic solvent in Examples 1 to 17 and Comparison Examples 1 to 3 is formed by ethylene carbonate (EC), propylene carbonate (PC), and dimethyl carbonate (DMC) at a weight ratio of 1:1:2, the lithium salt is lithium hexafluorophosphate at a concentration of 1 mol/L, and the types and contents of the additives are listed in Table 1 of FIG. 1, wherein lithium 2,2'-biphenyldisulfonate is abbreviated as BPL, lithium phthalate is abbreviated as PBL, 3,3-bis(cyanomethyl) glutaronitrile is abbreviated as BPN, and 1,3,6-hexanetrinitrile is abbreviated as PTN.

Step Two: Preparation of the Lithium-Ion Battery (1) Preparation of the Positive Film Disperse evenly the positive electrode active material lithium cobaltate $LiCoO_2$, the conductive agent conductive carbon black Super-P, and the bonding agent PVDF (with the mass percent at 10%) in a solvent N-methylpyrrolidone (NMP) to prepare the positive electrode slurry. In the positive electrode slurry, the solid content is 75 wt %, and the solid ingredients comprise 96 wt % lithium cobaltate, 2 wt % PVDF, and 2 wt % conductive carbon black Super-P. Subsequently, evenly coat the positive electrode slurry on a 16 μm-thick positive electrode current collector aluminum foil, the coating amount is 0.018 g/cm², then dry in an oven at 85° C., perform cold-pressing, edge trimming, cutting, and dividing, dry in vacuum at 85° C. for 4 h, and weld on the electrode tab to obtain the positive film.

(2) Preparation of the Negative Film

Disperse evenly the negative electrode active material artificial graphite, the conductive agent conductive carbon black Super-P, the thickening agent CMC (with the mass percent at 1.5%), and the bonding agent SBR (with the mass percent at 50%) in deionized water to prepare the negative electrode slurry. In the negative electrode slurry, the solid content is 50 wt %, and the solid ingredients comprise 96.5 wt % artificial graphite, 1.0 wt % conductive carbon black Super-P, 1.0 wt % CMC, and 1.5 wt % SBR. Evenly coat the negative electrode slurry on a 12 μm-thick negative electrode current collector copper foil, the coating amount is 0.0089 g/cm², then dry in an oven at 85° C., perform cold-pressing, edge trimming, cutting, and dividing, dry in vacuum at 110° C. for 4 h, and weld on the electrode tab to obtain the negative film.

(3) Preparation of the Separator

A 12 μm-thick polypropylene film is used as the separator.

(4) Preparation of the Lithium-Ion Battery

Fold the positive film, the separator, and the negative film sequentially such that the separator is disposed between the positive film and the negative film to act as an isolation, then wind to a square bare electric core with a thickness of 8 mm, a width of 60 mm, and a length of 130 mm. Place the bare electric core in an aluminum foil bag, bake in vacuum at 75° C. for 10 h, inject the electrolyte prepared in Step One, encapsulate in vacuum, let it stand still for 24 h, then charge to 4.2 V with a constant current of 0.1 C (160 mA), then charge at a constant voltage of 4.4 V until the current goes down to 0.05 C (80 mA), subsequently discharge at a constant current of 0.1 C (160 mA) to 3.0 V, repeat the charge and discharge twice, and lastly, charge to 3.8 V with a constant current of 0.1 C (160 mA), namely the preparation of the lithium-ion battery is completed.

Lastly, the performance testing process and testing results of the lithium-ion battery are provided.

Test I. Test of Overcharging Endurance Performance of the Lithium-Ion Battery

At 25° C., take 5 lithium-ion batteries for charging with a constant current of 1 C and at a constant voltage of 10 V, respectively, until overcharging, and at the same time, determine the peak temperatures of the lithium-ion batteries and the time to reach the peak temperatures, and observe the state of over-charged lithium-ion batteries.

Test II. Test of Cycle Performance of the Lithium-Ion Battery at High Temperature At 45° C., charge the lithium-ion batteries to 4.45 V with a constant current of 0.5 C, charge at a constant voltage of 4.45 V until the current is 0.05 C, and then discharge at a constant current of 0.5 C to 3.0 V, repeat charge and discharge in such a way, and calculate the capacity retention after 50, 100, 200, and 300 cycles of the lithium-ion batteries, respectively.

Capacity retention of a lithium-ion battery after n cycles= (discharge capacity after the $n^{th}$ cycle/discharge capacity after the first cycle)×100%.

The average capacity retention of 5 lithium ion batteries of the same Example number after n cycles is used as the capacity retention of said lithium ion battery after n cycles.

FIG. 1 is a diagram illustrating Table 1 that provides parameters and performance testing results of examples 1 to 17 and comparison examples 1 to 3.

Compared with lithium-ion batteries prepared in Comparison Examples 1 to 3, the overcharging endurance performance of the lithium-ion batteries prepared in Examples 1 to 17 is significantly improved, and the cycle performance of the lithium-ion batteries has experienced little change.

Compared with Example 3, under the same testing conditions, Example 11 has better overcharging endurance performance, but poorer capacity retention after cycles. This is because 1,3,6-hexanetrinitrile in Example 11 has an asymmetric structure. As a result, the substituting group has a different electron withdrawing capability, the molecules have increased polarity and become easier to diffuse, the reactivity is increased and the overcharging endurance performance of the lithium-ion battery is improved; at the same time, since 1,3,6-hexanetrinitrile has an asymmetric structure, its molecular stability is poorer than molecules having a symmetric substituting group structure, and therefore, the capacity retention of the lithium-ion battery after cycles is reduced slightly. It can be seen from Examples 16 and 17 that the combined use of a variety of additives A and the additive B, or the combined use of the additive A and a variety of additives B, can better improve the overcharging endurance performance, draw out the time to reach the peak temperature, and lower the peak temperature.

According to the disclosure and description above, those skilled in the art may further make variations and modifications to the above embodiments. Therefore, the present disclosure is not limited by the specific embodiments disclosed and described above. Some equivalent variations and modifications to the present disclosure shall also be encompassed the claims of the present disclosure. Although the Description uses some specific terms, in addition, the terms are used only for the purpose of easy description, which do not constitute any limitation to the present disclosure.

What is claimed is:

1. An overcharging preventive electrolyte, comprising:
a lithium salt;
a non-aqueous organic solvent; and
a combined additive, the combined additive comprising an additive A and an additive B,
wherein the additive A is at least one selected from Formula 1, Formula 2, and Formula 3, wherein each of $R_1$ to $R_6$ is one independently selected from the group consisting of fluorine, chlorine, bromine, nitro groups, cyano groups, alkyl groups, alkoxyl groups, halogenated alkyl groups, isocyanate groups, trifluoromethylsulfonyl groups, trifluoroacetyl groups, carboxyl groups, lithium carboxylates, sodium carboxylates, phosphate groups, lithium phosphates, sodium phosphates, sulfonic groups, lithium sulfonates or sodium sulfonates, n being a natural number in the range of 1 to 5,

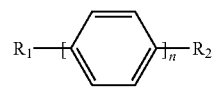

Formula 1

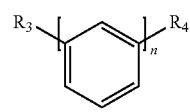

Formula 2

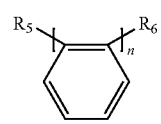

Formula 3 wherein the additive B is at least one selected from Formula 4, Formula 5, and Formula 6, wherein each of $R_7$ to $R_{14}$ is one independently selected from the group consisting of linear alkyl groups with 1 to 10 carbon atoms, side chain-containing alkyl groups, double bond-containing hydrocarbon groups, triple bond-containing hydrocarbon groups, ether bond-containing alkyl groups, or carbonyl-containing alkyl groups,

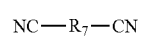

Formula 4

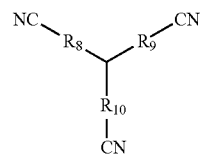

Formula 5

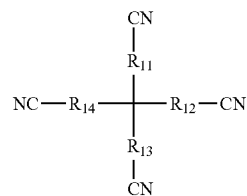

Formula 6 wherein any one of $R_8$, $R_9$, and $R_{10}$ may be absent such that CN is directly connected to a tertiary carbon in the center, wherein any one of $R_{11}$, $R_{12}$, $R_{13}$, and $R_{14}$ may be absent such that CN is directly connected to a quaternary carbon in the center.

2. The overcharging preventive electrolyte according to claim 1, wherein each of $R_1$ to $R_6$ is one independently selected from the group consisting of fluorine, chlorine, bromine, nitro groups, cyano groups, isocyanate groups, trifluoromethylsulfonyl groups, trifluoroacetyl groups, carboxyl groups, lithium carboxylates, sodium carboxylates, phosphate groups, lithium phosphates, sodium phosphates, sulfonic groups, lithium sulfonates or sodium sulfonates.

3. The overcharging preventive electrolyte according to claim 1, wherein each of $R_1$ to $R_6$ is one independently selected from the group consisting of lithium carboxylates, sodium carboxylates, lithium phosphates, sodium phosphates, lithium sulfonates or sodium sulfonates.

4. The overcharging preventive electrolyte according to claim 1, wherein the additive A is at least one selected from the group consisting of 4,4'-biphenyldisulfonic acid, lithium 4,4'-biphenyldisulfonate, sodium 4,4'-biphenyldisulfonate, 2,2'-biphenyldisulfonic acid, lithium 2,2'-biphenyldisulfonate, sodium 2,2'-biphenyldisulfonate, 3,3'-biphenyldisulfonic acid, lithium 3,3'-biphenyldisulfonate, sodium 3,3'-biphenyldisulfonate, 4'-ethyl-4-cyanobiphenyl, 3-trifluoromethylphenyl isocyanate, 4-methylphenyl isocyanate, 3-chloroanisole, 3-fluoroanisole, sodium phthalate, lithium phthalate, p-fluorotoluene, o-fluorotoluene, and m-fluorotoluene.

5. The overcharging preventive electrolyte according to claim 1, wherein the additive B is at least one selected from the group consisting of propanedinitrile, butanedinitrile, glutaronitrile, adiponitrile, heptanedinitrile, cyanomethoxy acetonitrile, 1,3,6-hexanetrinitrile, 1,2,3-propanetrinitrile, 1,3,5-pentanetrinitrile, 3,3-bis(cyanomethyl) glutaronitrile, and 3,3-bis(cyanomethyl) adiponitrile.

6. The overcharging preventive electrolyte according to claim 1, wherein Formula 4, Formula 5, and Formula 6 have an asymmetric structure.

7. The overcharging preventive electrolyte according to claim 6, wherein the additive B is at least one selected from the group consisting of cyanomethoxy acetonitrile, 1,3,6-hexanetrinitrile, and 3,3-bis(cyanomethyl) adiponitrile.

8. The overcharging preventive electrolyte according to claim 1, wherein:
the weight of the additive A is 0.01% to 5% of the total weight of said overcharging preventive electrolyte; and
the weight of the additive B is 0.01% to 10% of the total weight of said overcharging preventive electrolyte.

9. The overcharging preventive electrolyte according to claim 8, wherein:
the weight of the additive A is 0.1% to 3% of the total weight of said overcharging preventive electrolyte; and
the weight of the additive B is 0.1% to 5% of the total weight of said overcharging preventive electrolyte.

10. The overcharging preventive electrolyte according to claim 1, wherein:
the lithium salt is at least one selected from the group consisting of lithium hexafluorophosphate, lithium tetrafluoroborate, lithium hexafluoroarsenate, lithium perchlorate, lithium trifluorosulfonate, lithium bis(trifluoromethanesulfonyl)imide, lithium bis(fluoromethanesulfonyl)imide, and tris(trifluoromethanesulfonyl)methyl lithium; and
the organic solvent is at least one selected from the group consisting of ethylene carbonate, propylene carbonate, dimethyl carbonate, diethyl carbonate, methylethyl carbonate, γ-butyrolactone, methyl formate, ethyl formate, propyl formate, ethyl propionate, propyl propionate, butyl formate, butyl acetate, butyl propionate, butyl butyrate, and tetrahydrofuran.

11. A lithium-ion battery, comprising:
a positive film;
a negative film;
a separator disposed between the positive film and the negative film; and
an overcharging preventive electrolyte comprising:
a lithium salt;
a non-aqueous organic solvent; and
a combined additive, the combined additive comprising an additive A and an additive B, wherein the additive A is at least one selected from Formula 1, Formula 2, and Formula 3, wherein each of $R_1$ to $R_6$ is one independently selected from the group consisting of fluorine, chlorine, bromine, nitro groups, cyano groups, alkyl groups, alkoxyl groups, halogenated alkyl groups, isocyanate groups, trifluoromethylsulfonyl groups, trifluoroacetyl groups, carboxyl groups, lithium carboxylates, sodium carboxylates, phosphate groups, lithium phosphates, sodium phosphates, sulfonic groups, lithium sulfonates or sodium sulfonates, n being a natural number in the range of 1 to 5,

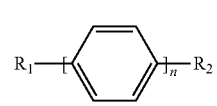

Formula 1

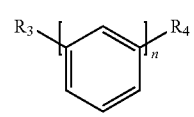

Formula 2

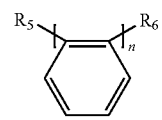

Formula 3 wherein the additive B is at least one selected from Formula 4, Formula 5, and Formula 6, wherein each of $R_7$ to $R_{14}$ is one independently selected from the group consisting of linear alkyl groups with 1 to 10 carbon atoms, side chain-containing alkyl groups, double bond-containing hydrocarbon groups, triple bond-containing hydrocarbon groups, ether bond-containing alkyl groups, or carbonyl-containing alkyl groups,

Formula 4

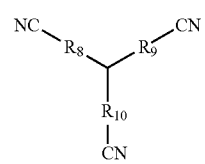

Formula 5

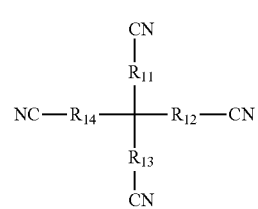

Formula 6 wherein any one of $R_8$, $R_9$, and $R_{10}$ may be absent such that CN is directly connected to a tertiary carbon in the center,
wherein any one of $R_{11}$, $R_{12}$, $R_{13}$, and $R_{14}$ may be absent such that CN is directly connected to a quaternary carbon in the center.

12. The lithium-ion battery according to claim 11, wherein each of $R_1$ to $R_6$ is one independently selected from the group consisting of fluorine, chlorine, bromine, nitro groups, cyano groups, isocyanate groups, trifluoromethylsulfonyl groups, trifluoroacetyl groups, carboxyl groups, lithium carboxylates, sodium carboxylates, phosphate groups, lithium phosphates, sodium phosphates, sulfonic groups, lithium sulfonates or sodium sulfonates.

13. The lithium-ion battery according to claim 11, wherein each of $R_1$ to $R_6$ is one independently selected from the group consisting of lithium carboxylates, sodium carboxylates, lithium phosphates, sodium phosphates, lithium sulfonates or sodium sulfonates.

14. The lithium-ion battery according to claim 11, wherein the additive A is at least one selected from the group consisting of 4,4'-biphenyldisulfonic acid, lithium 4,4'-biphenyldisulfonate, sodium 4,4'-biphenyldisulfonate, 2,2'-biphenyldisulfonic acid, lithium 2,2'-biphenyldisulfonate, sodium 2,2'-biphenyldisulfonate, 3,3'-biphenyldisulfonic acid, lithium 3,3'-biphenyldisulfonate, sodium 3,3'-biphenyldisulfonate, 4'-ethyl-4-cyanobiphenyl, 3-trifluoromethylphenyl isocyanate, 4-methylphenyl isocyanate, 3-chloroanisole, 3-fluoroanisole, sodium phthalate, lithium phthalate, p-fluorotoluene, o-fluorotoluene, and m-fluorotoluene.

15. The lithium-ion battery according to claim 11, wherein the additive B is at least one selected from the group consisting of propanedinitrile, butanedinitrile, glutaronitrile, adiponitrile, heptanedinitrile, cyanomethoxy acetonitrile, 1,3,6-hexanetrinitrile, 1,2,3-propanetrinitrile, 1,3,5-pentanetrinitrile, 3,3-bis(cyanomethyl) glutaronitrile, and 3,3-bis(cyanomethyl) adiponitrile.

16. The lithium-ion battery according to claim 11, wherein Formula 4, Formula 5, and Formula 6 have an asymmetric structure.

17. The lithium-ion battery according to claim 16, wherein the additive B is at least one selected from the group consisting of cyanomethoxy acetonitrile, 1,3,6-hexanetrinitrile, and 3,3-bis(cyanomethyl) adiponitrile.

18. The lithium-ion battery according to claim 11, wherein:
the weight of the additive A is 0.01% to 5% of the total weight of said overcharging preventive electrolyte; and
the weight of the additive B is 0.01% to 10% of the total weight of said overcharging preventive electrolyte.

19. The lithium-ion battery according to claim 18, wherein:
the weight of the additive A is 0.1% to 3% of the total weight of said overcharging preventive electrolyte; and
the weight of the additive B is 0.1% to 5% of the total weight of said overcharging preventive electrolyte.

20. The lithium-ion battery according to claim 11, wherein:
the lithium salt is at least one selected from the group consisting of lithium hexafluorophosphate, lithium tetrafluoroborate, lithium hexafluoroarsenate, lithium perchlorate, lithium trifluorosulfonate, lithium bis(trifluoromethanesulfonyl)imide, lithium bis(fluoromethanesulfonyl)imide, and tris(trifluoromethanesulfonyl)methyl lithium; and
the organic solvent is at least one selected from the group consisting of ethylene carbonate, propylene carbonate, dimethyl carbonate, diethyl carbonate, methylethyl carbonate, γ-butyrolactone, methyl formate, ethyl formate, propyl formate, ethyl propionate, propyl propionate, butyl formate, butyl acetate, butyl propionate, butyl butyrate, and tetrahydrofuran.

* * * * *